United States Patent
Bohrer et al.

[19]

[11] Patent Number: 5,943,497
[45] Date of Patent: Aug. 24, 1999

[54] OBJECT-ORIENTED APPARATUS AND METHOD FOR CONTROLLING CONFIGURATION OF OBJECT CREATION

[75] Inventors: Kathryn A. Bohrer, Austin, Tex.; Michael D. McKeehan, Rochester, Minn.; Andre Tost, Hannover, Germany; Erik E. Voldal, Rochester, Minn.

[73] Assignee: International Business Machines Corporation, Armonk, N.Y.

[21] Appl. No.: 08/846,974

[22] Filed: Apr. 30, 1997

[51] Int. Cl.⁶ .................................................. G06F 9/40
[52] U.S. Cl. ............................................................ 395/701
[58] Field of Search ................................... 395/701, 685; 707/103

[56] References Cited

U.S. PATENT DOCUMENTS

| | | | |
|---|---|---|---|
| 5,218,699 | 6/1993 | Brandle et al. | 395/684 |
| 5,257,371 | 10/1993 | Anezaki | 707/103 |
| 5,265,206 | 11/1993 | Shackelford et al. | 395/683 |
| 5,379,423 | 1/1995 | Mutoh et al. | 707/204 |
| 5,418,964 | 5/1995 | Conner et al. | 395/685 |
| 5,437,025 | 7/1995 | Bale et al. | 707/103 |
| 5,475,817 | 12/1995 | Waldo et al. | 395/683 |
| 5,481,718 | 1/1996 | Ryu et al. | 395/683 |
| 5,519,862 | 5/1996 | Schaeffer et al. | 395/701 |
| 5,535,134 | 7/1996 | Cohn et al. | 364/491 |
| 5,560,012 | 9/1996 | Ryu et al. | 395/701 |
| 5,566,302 | 10/1996 | Khalidi et al. | 395/680 |
| 5,577,251 | 11/1996 | Hamilton et al. | 395/671 |
| 5,581,765 | 12/1996 | Munroe et al. | 395/677 |
| 5,590,327 | 12/1996 | Biliris et al. | 395/670 |
| 5,604,892 | 2/1997 | Nuttall et al. | 395/500 |
| 5,613,120 | 3/1997 | Palay et al. | 395/710 |
| 5,692,195 | 11/1997 | Conner et al. | 395/685 |
| 5,732,263 | 3/1998 | Havens et al. | 707/103 |
| 5,787,283 | 7/1998 | Chin et al. | 395/701 |

OTHER PUBLICATIONS

Kauler, "Object–Oriented Flow Design," *Dr. Dobb's Journal*, Oct. 1996, pp. 54–68.

E. Cusack, "Inheritance In Object Oriented Z," 1991 European Conf. on Object–Oriented Programming, pp. 167–179, Jul. 1991.

E. Siepmann and A.R. Newton, "TOBAC: A Test Case Browser for Testing Object–Oriented Software," 1994 Int'l. Symp. on Software Testing and Analysis, pp. 154–168, Dec. 1994.

R.H. Shaw, "Building OLE Object Containers," PC Magazine, vol. 15(2), pp. 219(6), Jan. 1996.

S. Wingo and G. Shepherd, "Customizing MFC," Dr. Dobb's Journal, vol. 21(6), pp. 111(8), Dec. 1996.

*Primary Examiner*—Robert W. Downs
*Attorney, Agent, or Firm*—Martin & Associates, LLC; Derek P. Martin

[57] ABSTRACT

An object-oriented mechanism is disclosed that allows new configuration data to replace existing configuration data within an existing object-oriented program. The new configuration data allows an OO program to be quickly and easily generated from an existing OO program without manually changing the source code of the existing OO program. When a factory object creates an object in the existing OO program, the new configuration data that defines a modified class is used to create the object. In this manner class substitution or redefinition in an OO program is easily accomplished, thereby allowing a new OO program to be easily generated from an existing OO program (or framework).

15 Claims, 4 Drawing Sheets

OBJECT-ORIENTED APPARATUS AND METHOD FOR CONTROLLING CONFIGURATION OF OBJECT CREATION

BACKGROUND OF THE INVENTION

1. Technical Field

This invention generally relates to the data processing field. More specifically, this invention relates to the field of object creation in object-oriented systems.

2. Related Art

The development of the EDVAC computer system of 1948 is often cited as the beginning of the computer era. Since that time, overall computer system technology has progressed through the evolution of computer programs, or the ability of computer systems to perform a variety of tasks in an efficient manner. The EDVAC system used what was called a "one address" computer programming language. This language (in combination with other factors, such as limited memory, lack of proper tools, etc.) allowed for only the most rudimentary computer programs. By the 1960s, improvements in computer programming languages led to computer programs that were so large and complex that it was difficult to manage and control their development and maintenance.

As the complexity of computer hardware and software increases, the need to efficiently and effectively develop new software becomes more acute. Software development costs have continued to rise because complex programs take more time, and hence more money, to produce. Object-oriented programming (OOP) is one way computer programmers have sought to reduce the time and costs associated with developing complex software. A single object in OOP represents an individual operation or a group of operations that are performed by a computer system upon information controlled by the object. Objects can be thought of as autonomous agents that work together to perform certain tasks. Sometimes entire computer programs are made up of groupings of objects and sometimes objects are simply accessed by more traditional computer programs to perform one specific task or subtask.

The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a group of well-tested objects, a more stable, uniform, and consistent approach to developing new computer programs can be achieved.

Although object-oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

A problem, though, that exists with any object-oriented program is the difficulty of modifying the configuration of a specific object (by modifying its class definition) to fit a specific need, improve the program, or alternate between two or more implementations of that program. Each object-oriented class is characterized by configuration data that defines attributes of the class. Changing the way objects that are members of a class behave requires changing the configuration data for that class. The most common way of changing an object-oriented (OO) program so that the program uses a different class implementation than the existing class, would require changing the source code wherever the code creates the objects, rebuilding the program, and installing the program on all the systems intended to use the new class. If there are many different sets of such classes that could be changed, or various physical locations for creation of the objects, the combinatorial explosion of different versions of the program becomes completely unmanageable. Without methods for easily changing configuration data in an object-oriented system to define new classes from existing classes, the computer industry will never fully take advantage of the reusability of portions of object-oriented programs.

SUMMARY OF THE INVENTION

According to the present invention, an object-oriented mechanism is disclosed that allows new configuration data to replace existing configuration data within an existing object-oriented program. The new configuration data allows an OO program to be quickly and easily generated from an existing OO program without manually changing the source code of the existing OO program. When a factory object creates an object in the existing OO program, the new configuration data that defines a modified class is used to create the object. In this manner class substitution or redefinition in an OO program is easily accomplished, thereby allowing a new OO program to be easily generated from an existing OO program (or framework).

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

Figure 1:
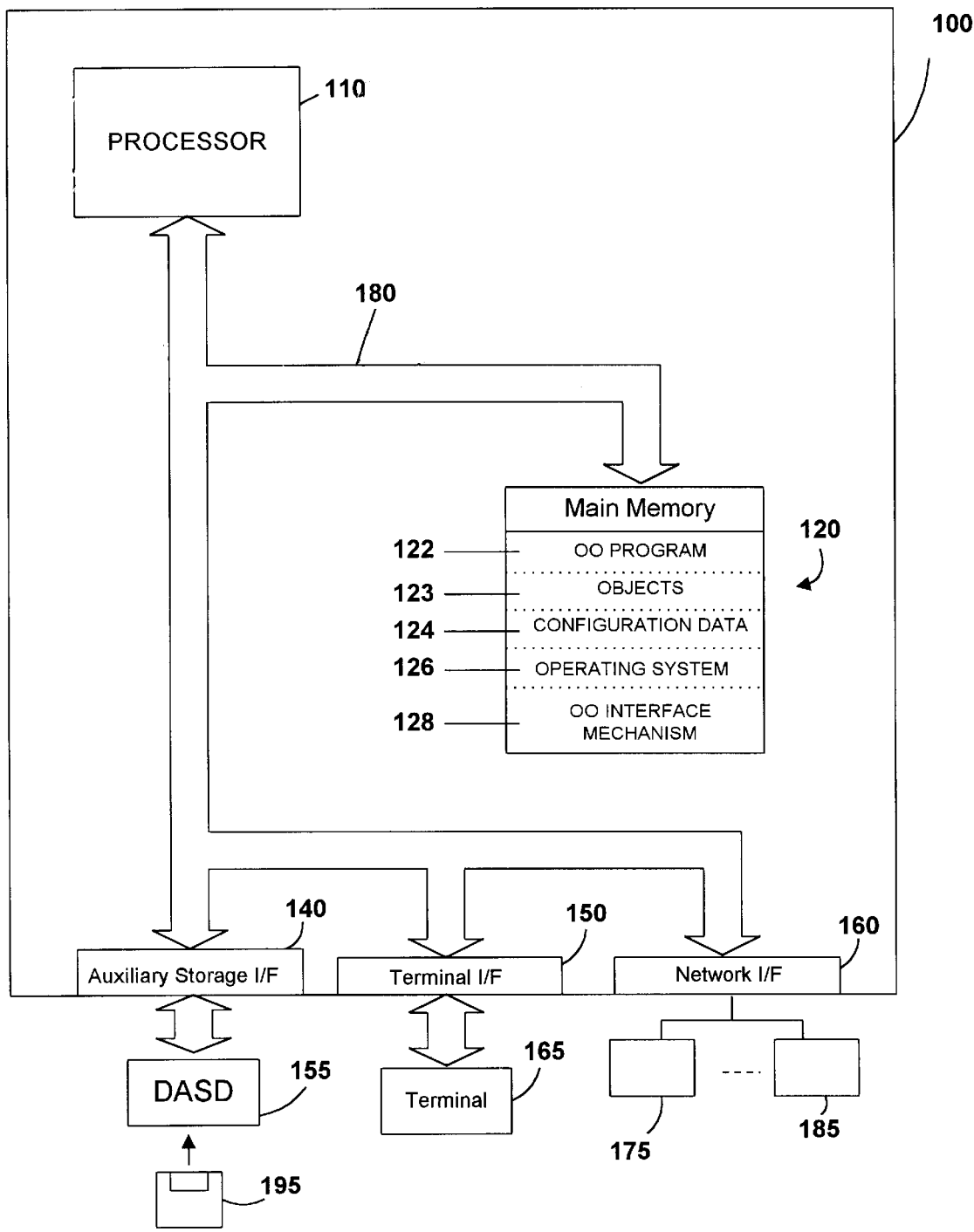
FIG. 1 is a block diagram of a computer system according to an embodiment of the present invention.

The present invention relates to object-oriented programming techniques. For those individuals who are not generally familiar with object-oriented programming, the Overview section below presents many of the concepts that will help to understand the invention. Individuals skilled in the art of object-oriented programming technology may wish to skip the Overview section and proceed directly to the Detailed Description section of this specification.

OVERVIEW

Object-oriented Technology v. Procedural Technology

Object-oriented programming is a method of implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects. Said another way, object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code that provide one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object-server object interactions form the basis for the distributed object system.

Another central concept in object-oriented programming is the class. A class is a template or prototype that defines a type of object. A class outlines the makeup of objects that belong to that class. By defining a class, objects can be created that belong to the class without having to rewrite the entire definition for each new object as it is created. This feature of object-oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object-oriented programming techniques. For example, Smalltalk, Object Pascal, C++ and Java are all examples of programming languages that support object-oriented programming to one degree or another.

Frameworks

As described in the Background section, OO frameworks are prefabricated structures of classes and class relationships that allow a programmer to extend the framework to build an OO program that performs desired functions. While in general terms an OO framework can be properly characterized as an OO solution, there is nevertheless a fundamental difference between a framework and a traditional OO program. The difference is that frameworks are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of replacing or reworking an existing solution.

Therefore, when framework designers set out to solve a particular problem, they do more than merely design individual objects and how those objects interrelate. They also design the core function of the framework (i.e., the part of the framework that should not be subject to potential customization and extension by the framework consumer) and the extensible function of the framework (i.e., that part of the framework that is to be subject to potential customization and extension.). Frameworks are mentioned here as one possible type of OO program that could benefit from the invention disclosed herein.

Factories

A factory is a part of a framework or other OO program used for the creation of an object. The factory generally consists of an object or group of objects working together to create a new entity (e.g., object) for the program. In many cases, the factory will determine at runtime the choice of the location and function of a class by using existing guidelines, called configuration data, and abstract interfaces or strings, called class tokens, entered in by the framework or OO program designer.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

DETAILED DESCRIPTION

FIG. 1 shows a block diagram of the computer system 100 in accordance with a preferred embodiment of the present invention. The computer system 100 of the preferred embodiment is an enhanced IBM AS/400 computer system. However, those skilled in the art will appreciate that the mechanisms and apparatus of the present invention apply equally to any computer system, regardless of whether the computer system is a complicated multi-user computing system or a single user device such as a personal computer or workstation. Computer system 100 suitably comprises a processor 110 connected to main memory 120, a memory controller 130, an auxiliary storage interface 140, a terminal interface 150, and network interface 160, all of which are interconnected via a system bus 180. Auxiliary storage interface 140 is used to connect mass storage devices (such as DASD device 155) to computer system 100. One specific type of DASD device is a floppy disk drive, which may store data to and read data from a floppy diskette 195. Note that various modifications, additions, or deletions may be made to the computer system 100 illustrated in FIG. 1 within the scope of the present invention such as the addition of other peripheral devices; FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor.

Main memory 120 contains an object-oriented (OO) program 122, objects 123, configuration data 124, an operating system 126, and an OO interface mechanism 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while program 122, objects 123, configuration data 124, operating system 126, and OO interface mechanism 128 are shown to reside in main memory 120, those skilled in the art will recognize that these programs are not necessarily all completely contained in main memory 120 at the same time. (It should also be noted that the term "memory" is used herein to generically refer to the entire virtual memory of computer system 100.)

Operating system 126 is a multitasking operating system known in the industry as OS/400; however, those skilled in the art will appreciate that the spirit and scope of the present invention is not limited to any one operating system. Operating system 126 preferably supports an OO programming environment such as that provided, for example, by the C++ programming language.

Although computer system 100 is shown to contain only a single main processor and a single system bus, those skilled in the art will appreciate that the present invention may be practiced using a computer system that has multiple processors and/or multiple buses. In addition, the interfaces (called input/output (I/O) processors in AS/400 terminology) that are used in the preferred embodiment each include separate, fully programmed microprocessors that are used to off-load compute-intensive processing form processor 110. However, those skilled in the art will appreciate that the present invention applies equally to computer systems that simply use I/O adapters to perform similar functions.

Terminal interface 150 is used to directly connect one or more terminals 165 to computer system 100. These terminals 165, which may be non-intelligent or fully programmable workstations, are used to allow system administrators and users to communicate with computer system 100.

Network interface 160 is used to connect other computer systems and/or workstations (e.g., 175 and 185 in FIG. 1) to computer system 100 in networked fashion. The present invention applies equally no matter how computer system 100 may be connected to other computer system and/or workstations regardless of whether the connection(s) is made using present-day analog and/or digital techniques or via some networking mechanism of the future. It is also important to point out that the presence of network interface 160 within computer system 100 means that computer system 100 may engage in cooperative processing with one or more other computer systems or workstations. Of course, this in turn means that the programs shown in main memory 120 need not necessarily all reside on computer system 100. For example, one or more portions of program 122 may reside on another system and engage in cooperative processing with one or more programs that reside on computer system 100. This cooperative processing could be accomplished through use of one of the well know client-server mechanisms such as remote procedure call (RPC).

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 195) and CD ROMS, and transmission type media such as digital and analog communication links.

OO interface mechanism 128 provides a way to generate an OO program (e.g., 122) from a different OO program. The remainder of this specification discloses various methods of implementing OO interface mechanism 128. The disclosed embodiments avoid the difficulties with working with existing OO programs (e.g., frameworks) by allowing data administrator control over the modification of configuration data without having to change the whole program.

Figures 2, 3:
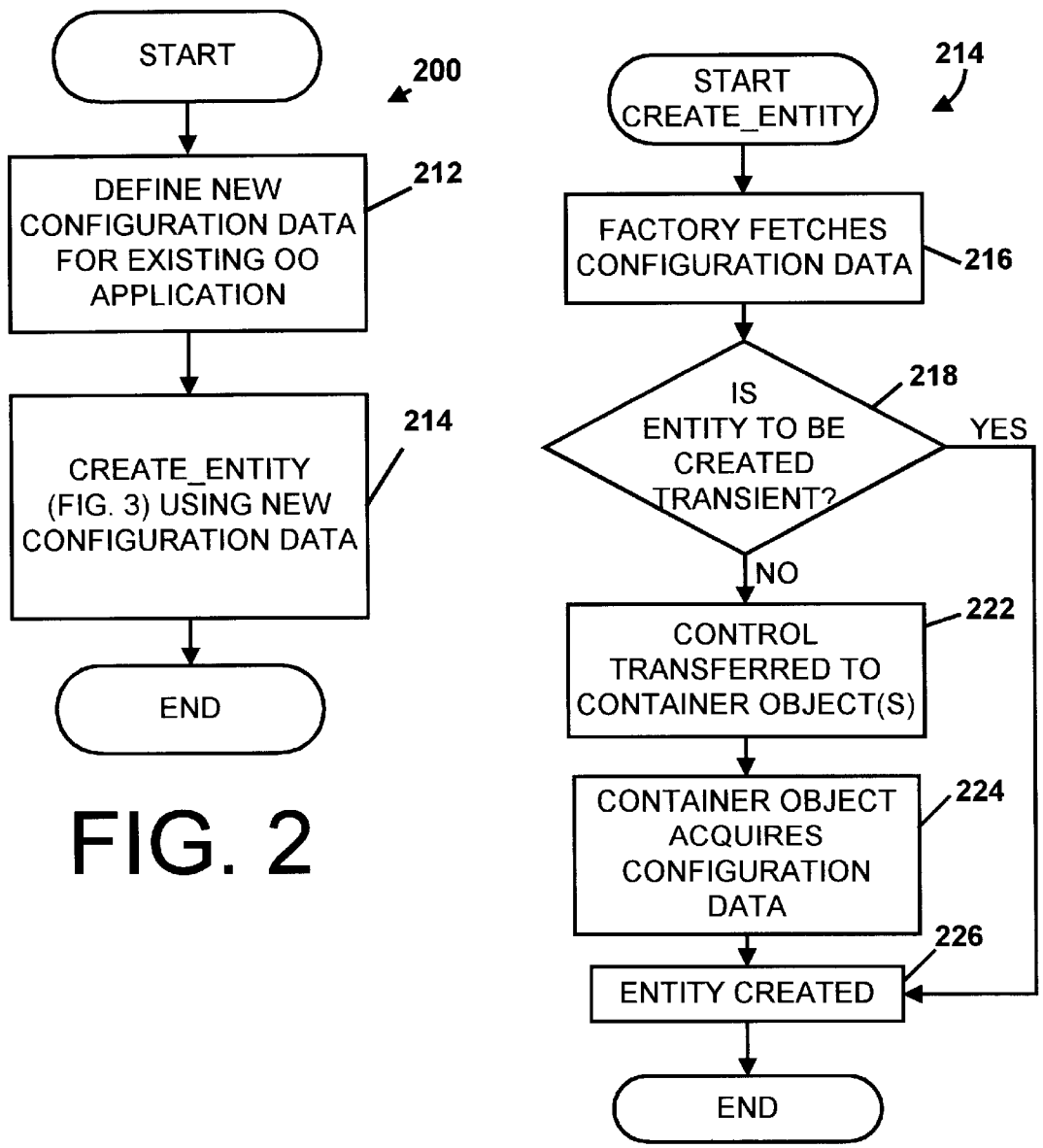
FIGS. 2 and 3 are flow diagrams showing steps in accordance with the present invention for generating a new object-oriented program from an existing object-oriented program.

As shown in FIGS. 2 and 3, the method of interfacing with an existing OO program in accordance with the present invention may be represented by a series of steps. In FIG. 2, the first step is to define new configuration data for an exiting OO program (step 212). The new configuration data may be defined by a data administrator through a configuration interface, allowing the data administrator to easily enter in the desired data. A create_entity() method is then invoked that uses the new configuration data (step 214). FIG. 3 illustrates a specific example of steps used to create a new entity during step 214 of FIG. 2. When the create_ entity() method is invoked, the factory will fetch the new configuration data (step 216). The factory then determines from the parameter passed during the create_entity() method call if the entity to be created is transient (step 218). That is, when an entity needs to be created with specific containers (i.e., the entity needs to associate with a specific location for security reasons, or persistence reasons, etc., as discussed in greater detail below), the entity is a persistent entity. Otherwise, the entity to be created is a transient entity and the factory may go ahead and directly create the entity (step 218=yes, step 226). If the entity is not transient, the control is then transferred over to the persistent container object (step 218=no, step 222). The persistent container object acquires the configuration data needed for creating the proper persistent containers for the entity (step 224). The persistent container object then creates the entity within its proper persistent containers (step 226). Thus, new configuration data is defined for creating a new entity, such as an object, and may thus be used to define a replacement class, which replaces the original class that would have been used from existing configuration data.

Figure 4:
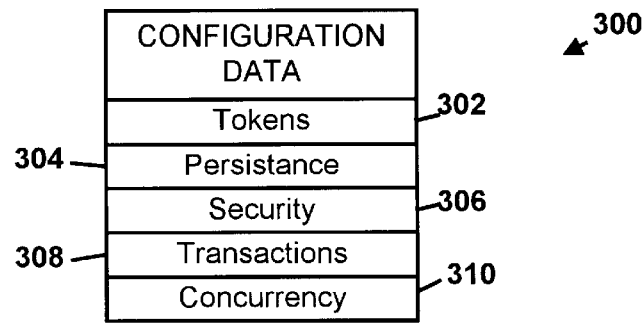
FIG. 4 is a block diagram illustrating exemplary configuration data.

FIG. 4 illustrates exemplary configuration data 300 used to determine the location and creation of an entity (e.g., an object that is a member of a class defined by the configuration data 300). The configuration data 300 generally contains the class tokens 302 utilized by their corresponding factories, and persistent container elements such as persistence 304, security 306, transactions 308, and concurrency 310. Configuration data may be entered utilizing any appropriate type of configuration utility. Although the aforementioned persistent containers and configuration data will be described in detail, other appropriate persistent containers and data may also be used.

The token (or tokens) 302 utilized in configuration data 300 defines a mapping from the class tokens used by the programs, to specific concrete classes and locations to create new instances (i.e., objects). The tokens 302 used are either arbitrary strings, or abstract interfaces that the actual entity created must support. Class tokens are used with factory implementations in place of concrete class names and locations to facilitate the determination of the location and function of an object created as a member of a new class at runtime.

A persistent container defines a scope of the class or object being created with a particular physical system and server process within the system. There may be many persistent containers within one server process, and/or many server processes within one system. Each persistent container may be represented by a container ID, which is a unique string indicating the types of support the data administrator desires for the entity. As aforementioned, four examples of persistent container elements and support include persistence 304, security 306, transactions 308, and concurrency 310.

Persistence 304 is a container element that allows the created entity to "exist" beyond a single process. That is, the entity may be stored in specific locations for future use by other processes, potentially in remote locations. Persistent containers support persistence 304 of an entity through the use of relational data bases (RDB), POSIX files, single-level storage, etc. For example, the data administrator may indicate that they would like the created entity to remain in a single-level storage. The factory would recognize the container ID and transfer control to the persistent container object. The persistent container object then acquires the container ID and accordingly creates an entity that is stored in a single-level storage. In addition, instances of a class may be stored in multiple persistent containers, each container persisting its instances to different persistent stores. For example, the same class can be created in a container over a POSIX file system as well as in a container over a relational database.

Security may also be enforced through a security container element 306. For example, some persistent containers may allow any authenticated user to have full access to the objects they support. Others may enforce access at the granularity of the whole persistent container, instances of specific classes, individual objects, or at the granularity that the persistent data store provides (such as at the table level for RDB). Again, the level of security is indicated in the container ID.

Transactions between objects may also be supported by a transaction container element 308. Persistent containers may define single-phase transactions (e.g., no handshaking between communicators), or support two-phase transactions (e.g., handshaking between communicators). Some persistent containers may support both single-phase and two-phase transactions.

Concurrency for objects may also be supported by a concurrency container element 310. With concurrency, a persistent container may be configured to "own" the persistent storage. In this case, performance can be optimized, since there will generally be no competition for persistent storage by programs outside the persistent container. On the other hand, a persistent container may be configured to "share" the persistent storage, in which case the persistent container may have to share access with other code that might access the persistent data directly (such as a non-OO program accessing the same RDB table that this object program is accessing through the persistent container.)

Figure 5:
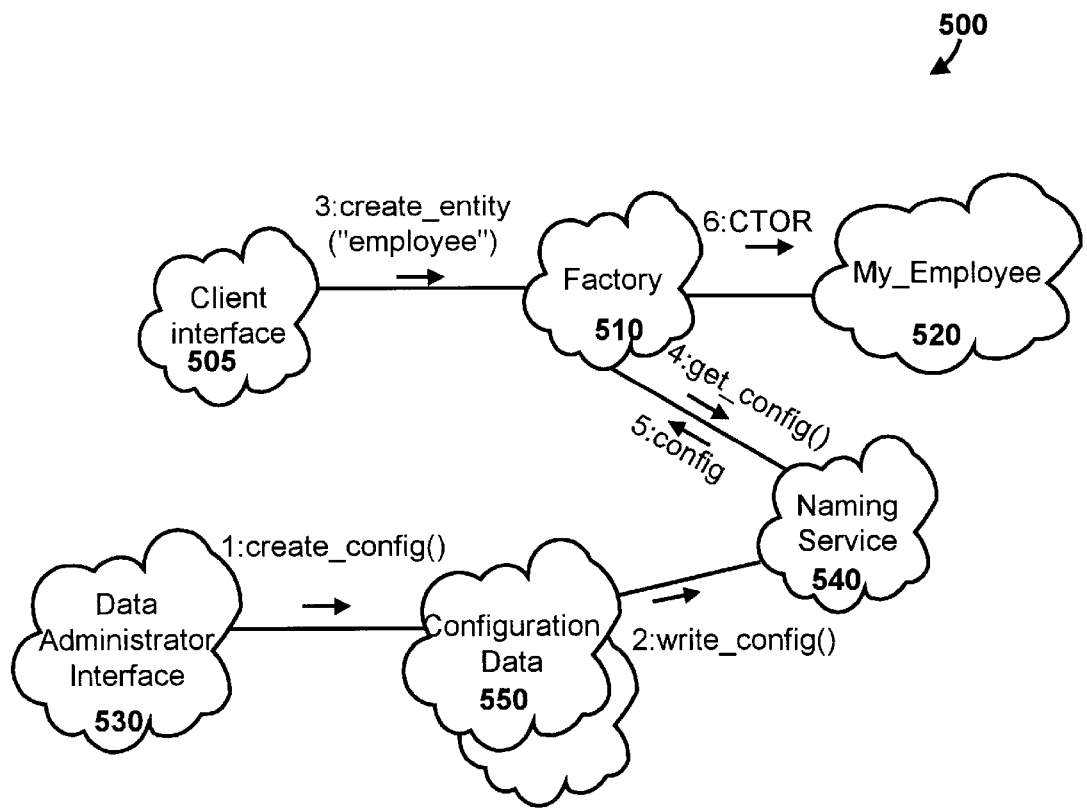
FIGS. 5 and 6 are object diagrams illustrating object-oriented mechanisms that generate a replacement class for an existing class in an object-oriented program in accordance with preferred embodiments of the present invention.
Figure 6:
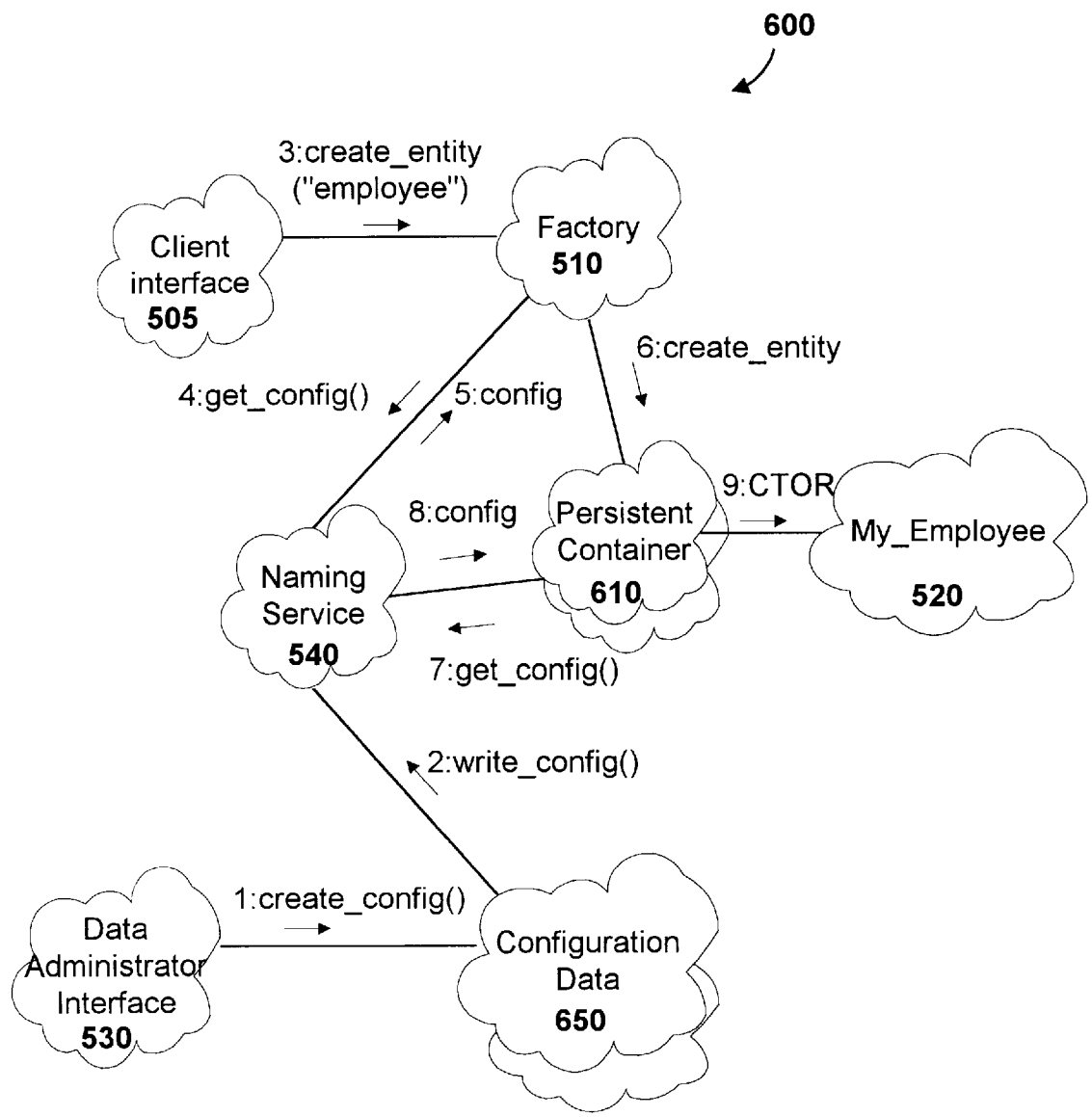

FIGS. 5 and 6 illustrate exemplary object diagrams for creating an object using the class token of "employee". In known OO programming environments, configuration data is defined and fixed in the source code that characterizes each class. When an object is to be created as a member of a particular class, a string or "token" is passed to a factory object, which retrieves the configuration data relating to the class specified by the token and creates an object as a member of the class specified by the configuration data. In order to change a class definition in known OO programming environments, the source code must be changed and re-compiled to generate a new OO program. However, in the case of many OO programs, particularly frameworks, the user of the OO program does not have access to the source code. What is needed is a mechanism that allows a user to modify the configuration data that a factory in an OO program uses to create an object so that the OO program may be used to create many different programs. This mechanism is OO interface mechanism 128 as shown in FIG. 1 and described below.

One specific implementation of OO interface mechanism 128 is shown by system 500 of FIG. 5. System 500 includes: a ClientInterface object 505, a Factory object 510, a DataAdministratorInterface object 530, a NamingService object 540, a ConfigurationData object 550, and the resultant object My_Employee 520 that is created by the Factory object 510. A data administrator initially creates the configuration data that defines a new class, and writes this configuration data to the DataAdministratorInterface object 530, which in turn calls the create_config() method on the ConfigurationData object 550 (step 1). The ConfigurationData object then invokes the write_config() method on the NamingService object to store the configuration data in the NamingService object (step 2). The NamingService object thus contains the configuration data for each object that is created by the Factory object 510. A data administrator inputs the configuration data via the DataAdministratorInterface object 530 using any suitable configuration tool that facilitates the inputting of configuration data by a data administrator without the administrator having to know the OO programming language. For example, the interface may be a set of windows with pull-down menus, allowing the data administrator to set up the configuration as desired. Once the required configuration data has been defined by the data administrator, system 500 may be used to create objects.

The factory is invoked at run-time when any program, represented by the ClientInterface object, invokes the create_entity() method on the Factory object 510, passing the class token as a parameter (step 3). In the example in FIG. 5, the class token is "employee", which tells Factory object 510 to retrieve the configuration data corresponding to the employee class. Note that prior to invoking the create_entity() method on the factory class, the client initializes the factory for this example with the appropriate data for class Employee (e.g., name, birthdate, social security number, etc.). Invoking the create_entity() method on the Factory object 510 causes the Factory object 510 to invoke the get_config() method on the NamingService object 540 (step 4), and the NamingService object 540 then returns the configuration data corresponding to the "employee" class (step 5). The factory object then creates an object My_Employee 520 from the configuration data that was written by the data administrator for the employee class (step 6).

As shown in FIG. 5, Factory object 510 uses new configuration data 550 as inputted by a data administrator into a DataAdministratorInterface object 530 as taught by the present invention. System 500 is used In this example to create a transient object. Now, instead of Factory object 510 outputting class Employee when class token "employee" is input from client interface 505, Factory object 510 outputs class My_Employee 520. The class token "employee" is mapped to class My_Employee by virtue of the configuration data 550 for the "employee" class containing data that defines the My_Employee class. This configuration data was previously written to the NamingService object 540. In the preferred embodiment, the NamingService object 540 uses a cache memory to quickly access the most recently accessed configuration data objects. If a factory requests a different configuration data not found in the cache, the NamingService object may then retrieve the needed configuration data from the ConfigurationData object. Thus, in the example for FIG. 5, the same class token "employee" may define new classes (such as My_Employee, Your_Employee, etc.) as defined by configuration data 550. This OO interface mechanism eliminates the need for providing an extensible function of the OO program for class Employee, having to input multiple class token parameters, indicating the specific type or location of the class being created, or recreating multiple OO programs to cover all the classes desired by the OO consumer. In short, the OO interface mechanism disclosed herein allows an existing OO program to be modified to accommodate new functions without changing the OO program itself.

FIG. 6 illustrates a system 600 for creating a persistent entity. As in system 500 of FIG. 5, system 600 includes a ClientInterface object 505, a Factory object 510, a DataAdministratorInterface 530, a NamingService object 540, and the resultant My_Employee object 520. Also included are ConfigurationData object 650 and Persistent Container object 610. As before, the configuration data is input by using the DataAdministratorInterface object 530 to invoke the create_config() method on the ConfigurationData object 650 (step 1). The configuration data 650 is then written to the NamingService object 540 by invoking its write config() method (step 2). At this point the system 600 has proper configuration data in place for the desired classes under which the Factory object 510 may instantiate objects.

A client program or object (represented as ClientInterface object 505) then invokes the create_entity() method on the Factory object 510 (step 3). The Factory object 510 requests the configuration data from the NamingService object 540 (step 4), which then returns the requested configuration data (step 5). The Factory object 510 recognizes that the configuration data includes a container ID, indicating a persistent object is to be created in the specified persistent container. Factory object 510 then invokes the create_entity() method on the appropriate Persistent Container object 610 (as specified in the configuration data) (step 6). Persistent Container object 610 then requests the configuration data from the NamingService object 540 by invoking its get_config() method (step 7), and the NamingService object 540 returns the requested configuration data (step 8). Persistent Container object 610 then creates the desired persistent object (step 9). In this example, the object "His_employee" is created with a specific location specified by the appropriate persistent containers.

Besides providing flexibility of choosing different classes and storage locations between different installations, this invention also may provide flexibility of choosing different classes and storage locations between different users or applications. This may be accomplished by having a search done for configuration data based on a search path. For example, the search path may have an initial default value based on the user's identity. The search path may also be changed to appropriate values for the specific currently running program. In this case, the configuration data may be stored in a hierarchical directory structure (e.g., using any type of general hierarchical directory support found on most operating systems).

Thus, an OO interface mechanism is disclosed that modifies system configurations and to generate new OO programs from existing OO programs (such as frameworks) while keeping the integrity of the existing OO program.

While the invention has been particularly shown and described with reference to preferred exemplary embodiments thereof, it will be understood by those skilled in the art that various changes in form and details may be made therein without departing from the spirit and scope of the invention.

What is claimed is:

1. An apparatus comprising:

a processor;

a memory coupled to the processor; and an object-oriented interface mechanism residing in the memory for replacing existing configuration data that specifies a first class of an object-oriented program with new configuration data that specifies a replacement class, wherein said new configuration data comprises persistent container elements to determine a location and class of objects instantiated under said replacement class, wherein said persistent container elements include security, persistence, transactions and concurrency.

2. An apparatus comprising:

a processor;

a memory coupled to the processor; and an object-oriented interface mechanism residing in the memory for replacing existing configuration data that specifies a first class of an object-oriented program with new configuration data that specifies a replacement class, wherein said object-oriented interface mechanism comprises a search path mechanism for choosing said replacement class based on a program that invokes the object oriented interface mechanism.

3. An apparatus comprising:

a processor;

a memory coupled to the processor; and an object-oriented interface mechanism residing in the memory for replacing existing configuration data that specifies a first class of an object-oriented program with new configuration data that specifies a replacement class, wherein said object-oriented interface mechanism comprises a search path mechanism for choosing said replacement class based on a user identification.

4. An apparatus comprising:

a processor;

a memory coupled to the processor;

an existing object-oriented program residing in the memory;

at least one existing configuration data object residing in the memory that determines the attributes of at least one existing class within the existing object-oriented program; and an object-oriented interface mechanism residing in the memory that replaces at least one existing configuration data object that specifies a first of the at least one existing classes with new configuration data that specifies a replacement class, wherein said new configuration data comprises persistent container elements to determine a location and class of objects instantiated under said replacement class, wherein said persistent container elements include security, persistence, transactions and concurrency.

5. A method for replacing an existing class with a replacement class in a distributed object environment, the method comprising the steps of:

(1) providing a factory object having existing configuration data for creating an original class;

(2) defining new configuration data for creating a replacement class; and (3) replacing said existing configuration data with said new configuration data, thereby defining said replacement class; and (4) choosing said replacement class based on a program being used.

6. A method for replacing an existing class with a replacement class in a distributed object environment, the method comprising the steps of:

(1) providing a factory object having existing configuration data for creating an original class;

(2) defining new configuration data for creating a replacement class; and (3) replacing said existing configuration data with said new configuration data, thereby defining said replacement class; and (4) choosing said replacement class based on a user identification.

7. A program product comprising:

an object-oriented interface mechanism that replaces existing configuration data that specifies a first class of an object-oriented program with new configuration data that specifies a replacement class, wherein said new configuration data comprises persistent container elements to determine a location and class of said replacement class, wherein said persistent container elements include security, persistence, transactions and concurrency; and signal bearing media bearing the object-oriented interface mechanism.

8. The program product of claim 7 wherein said signal bearing media comprises recordable media.

9. The program product of claim 7 wherein said signal bearing media comprises transmission media.

10. A program product comprising:

an object-oriented interface mechanism that replaces existing configuration data that specifies a first class of an object-oriented program with new configuration data that specifies a replacement class, wherein said object-oriented interface mechanism further comprises a search path mechanism for choosing said replacement class based on a program that invokes the object oriented interface mechanism; and signal bearing media bearing the object-oriented interface mechanism.

11. The program product of claim 10 wherein said signal bearing media comprises recordable media.

12. The program product of claim 10 wherein said signal bearing media comprises transmission media.

13. A program product comprising:

an object-oriented interface mechanism that replaces existing configuration data that specifies a first class of an object-oriented program with new configuration data that specifies a replacement class wherein said object-oriented interface mechanism comprises a search path mechanism for choosing said replacement class based on a user identification; and signal bearing media bearing the object-oriented interface mechanism.

14. The program product of claim 13 wherein said signal bearing media comprises recordable media.

15. The program product of claim 13 wherein said signal bearing media comprises transmission media.

* * * * *